United States Patent
Oki (10) Patent No.: US 8,167,505 B2
(45) Date of Patent: May 1, 2012

(54) PLUGGABLE SYSTEM BETWEEN OPTICAL TRANSCEIVER AND HOST SYSTEM

(75) Inventor: Kazushige Oki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 363 days.

(21) Appl. No.: 12/561,909

(22) Filed: Sep. 17, 2009

(65) Prior Publication Data

US 2010/0067854 A1    Mar. 18, 2010

Related U.S. Application Data (60) Provisional application No. 61/098,093, filed on Sep. 18, 2008.

(51) Int. Cl.
   G02B 6/36        (2006.01)
   H01R 33/945      (2006.01)
   H04B 10/00       (2006.01)

(52) U.S. Cl. ............... 385/92; 385/52; 385/88; 385/89; 385/139; 439/577; 398/135; 398/139

(58) Field of Classification Search ............... 385/139, 385/134, 135, 136, 137, 138, 88, 89, 92, 385/52; 398/135, 138, 139, 140; 438/577; 439/577

See application file for complete search history.

(56) References Cited

U.S. PATENT DOCUMENTS

| | | | | |
|---|---|---|---|---|
| 5,140,663 | A * | 8/1992 | Edwards et al. | 385/90 |
| 6,304,436 | B1 * | 10/2001 | Branch et al. | 361/753 |
| 7,433,193 | B2 * | 10/2008 | Yee et al. | 361/715 |
| 2004/0081418 | A1 * | 4/2004 | Kurashima et al. | 385/134 |
| 2007/0086710 | A1 * | 4/2007 | Takizawa et al. | 385/88 |
| 2007/0110374 | A1 | 5/2007 | Oki et al. | |
| 2007/0133930 | A1 | 6/2007 | Ishikawa | |
| 2010/0067854 | A1 * | 3/2010 | Oki | 385/92 |

* cited by examiner

*Primary Examiner* — Brian Healy
(74) *Attorney, Agent, or Firm* — Venable LLP; Michael A. Sartori; Leigh D. Thelen (57) ABSTRACT

A mechanism to fix the new type of the pluggable optical transceiver to the host system is disclosed. The optical transceiver provides the screws, while, the host system has the face panel with a port and the rail system between which the optical transceiver is set through the port. In the present invention, the screw of the transceiver is fastened to the rail not the face panel, and the rail is precisely aligned with the electrical connector. Thus, the pluggable transceiver in the electrical plug thereof is exactly mated with the electrical connector of the host system.

16 Claims, 14 Drawing Sheets

FIG. 14B

PLUGGABLE SYSTEM BETWEEN OPTICAL TRANSCEIVER AND HOST SYSTEM

CROSS REFERENCE TO RELATED APPLICATION

This application claims priority to U.S. Provisional Patent Application Ser. No. 61/098,093, filed on Sep. 18, 2008, which is incorporated herein by reference in its entirety.

BACKGROUND OF THE INVENTION

1. Field of the Invention

The present invention relates to a pluggable optical transceiver used in an arrangement that, inserting into a rail or a cage prepared on a host board, the electrical plug implemented in a rear end thereof mates with the electrical connector set in the deep end of the rail or the connector.

2. Related Prior Art

Various prior documents have been disclosed a pluggable system between the host equipment and the optical transceiver, such as US-2004081418A, US-20070133930A and US-20070110374A. The installation of the pluggable transceiver on the host device was accomplished by setting the pluggable transceiver in the cage or the rail they were prepared in the host device. The optical transceiver provided an electrical plug in the end thereof, while, the cage or the rail installed an electrical connector in the deep end thereof. The communication path between the transceiver and the host device, or the path for supplying the electrical power form the host device to the transceiver, was established by mating the plug with the connector.

As the amount of the communication increases, the performance necessary to the optical transceiver has steadily and rapidly risen. The conventional transceiver disclosed the prior applications above reached the transmission speed to 10 Gbps; while, recent request in the field has raised the speed over 10 Gbps. One solution is proposed, in which four (4) signals each having the transmission speed of 10 Gbps and a specific wavelength different from each other are transmitted in single fiber, which realizes the total communication capacity of 40 Gbps. In another proposal, four signals with the transmission speed of 25 Gbps are wavelength multiplexed to realize the total capacity of 100 Gbps.

Even in new standards, the communication between the transceiver and the host device is limited in the speed thereof to 10 Gbps because of the electrical mismatching of the transmission impedance at the electrical connector and the plug. Therefore, it is indispensable to transmit a plurality of electrical signals with the speed of 10 Gbps. In the standard of the 100 Gbps transmission mentioned above, 10 electrical signals are necessary to be transmitted or received between the transceiver and the host device. These 10 signals (10×10 Gbps) are multiplexed to four faster electrical signals each showing the speed of 25 Gbps (4×25 Gbps) and optically transmitted in the optical fiber as the wavelength division multiplexed (WDM) signals. For the receiver, 4×25 Gbps optical signals are received and electrically de-multiplexed to 10×10 Gbps signals which are transmitted to the host device.

Accordingly, the electrical connector and the plug are necessary to provide at least 20 electrodes for both operations of the transmission and the reception. Moreover, greater power consumption is necessary for the electronic components in the transceiver to process such high speed signals and more ground patterns are also necessary to suppress the waveform degradation. These critical conditions result in the increase of the number of the electrode in the connector and the plug. The new standards relating to the 100 Gbps transmission has ruled the number of the electrode is 148 pins.

In another aspect of the electronic equipment, because a smaller sized housing is permanently requested in the field, it is not allowable solution to enlarge the size of the housing as the increase of the number of the electrode. The standard of the 100 Gbps transmission has defined the width of the housing to be only 72 mm. When 148 pins mentioned above are set within this width, the pitch of the electrode becomes only 0.8 mm. Therefore, a new mechanism is necessary to secure the reliable engagement between the multi-pinned connector and the plug.

SUMMARY OF THE INVENTION

An aspect of the present invention relates to a pluggable system between the optical transceiver and the host system. The system comprises a rail, a face panel and a screw. The rail and the face panel are provided in the host system; while the screw is provided in the optical transceiver. The rail includes a beam and a pair of legs each extending from the side of the beam to from a U-space within which the transceiver is set. The face panel includes a port through which the optical transceiver passes to be fixed in the space formed by the rail. In the present invention, the screw provided in the optical transceiver is fixed to the rail as freely passing through the face panel.

A new type of the optical transceiver has a plurality of, for instance, more than hundreds (100) electrodes to communicate with the host system. Moreover, the communication between the optical transceiver and the host system increases the transmission speed, often exceeds 10 Gbps. Accordingly, the electrodes in the connector, also in the plug, forced to be downsized, which results in the reliable and precise mechanism to set the pluggable optical transceiver in the host system. In the present invention, the optical transceiver is directly set to respect to the rail, not to the face panel of the host system, and the connector is rigidly and reliably aligned with the rail; accordingly, the electrical plug in the optical transceiver may be precisely and reliable mated with the connector in the host system.

BRIEF DESCRIPTION OF DRAWINGS

The foregoing objects and advantages of the present invention may be more readily understood by one skilled in the art with reference being had to the following detailed description of several embodiments thereof, taken in conjunction with the accompanying drawings wherein like elements are designated by identical reference numerals throughout the several views, and in which.

DESCRIPTION OF PREFERRED EMBODIMENTS

Next, preferred embodiments of the present invention will be described as referring to accompanying drawings.

The pluggable optical transceiver has been developed as following: the outer shape/dimensions and the electrical characteristics have been ruled in the standards called as the multi-source-agreements (MSA). Typical MSA is, what is called, the small form-factor pluggable (SFP) standard. An optical transceiver with a function to be operated around 10 Gbps is already arranged in the MSA. Various manufacturers are currently going to arrange a new standard for transceivers operable over 10 Gbps, namely, 40 Gbps and 100 Gbps. Transceivers following the already established standards are called as, for instance, SFP, XFP, X2, and something like that, but the standard for a transceiver operable at 100 Gbps will be called as "Century FP" (CFP transceiver). We hereafter call the transceiver according to the present application as CFP transceiver.

Figure 1:
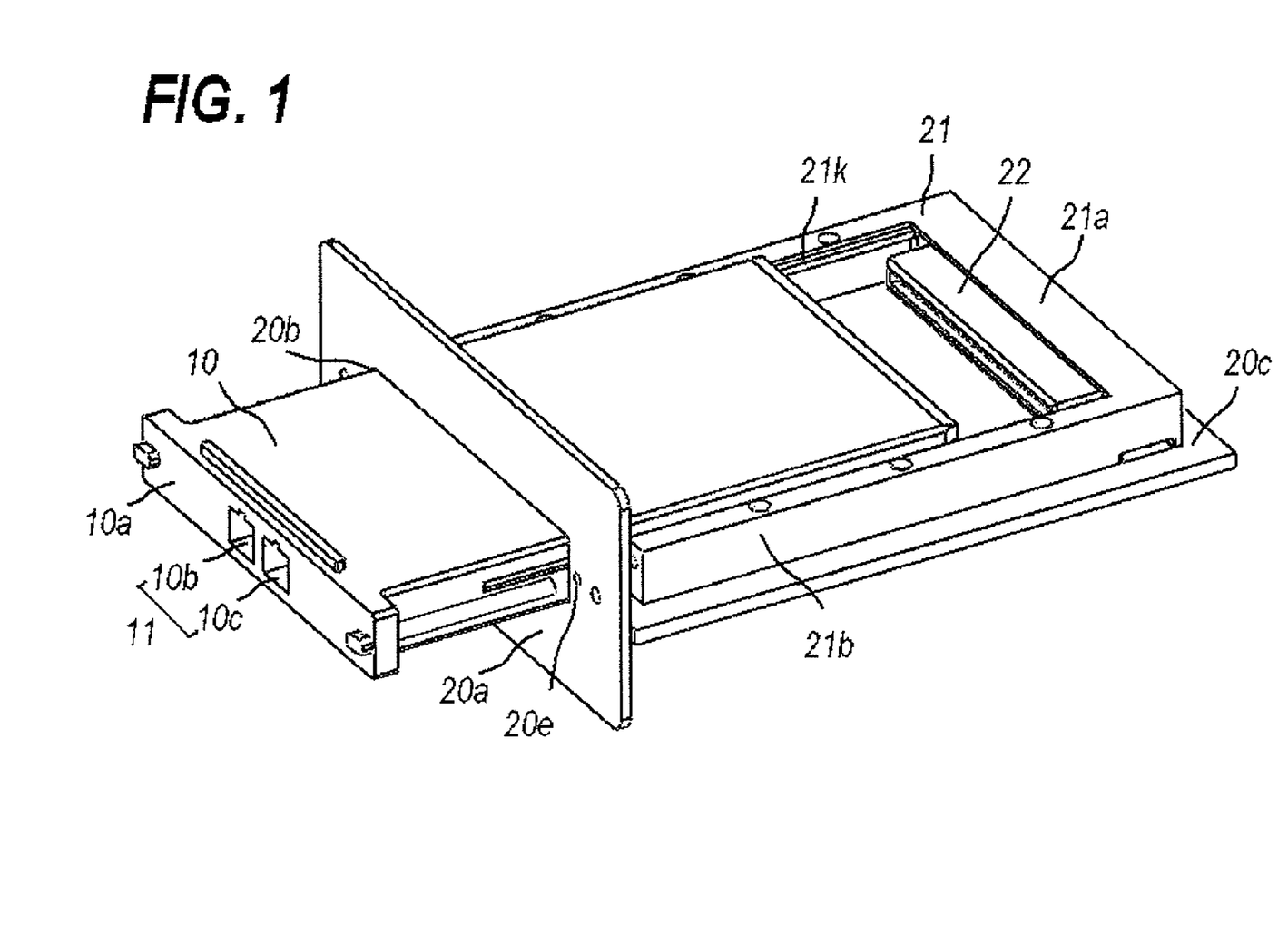
FIG. 1 is a perspective view of the transceiver system that includes the CFP transceiver setting in the rail with the electrical connector on the host board.

FIG. 1 schematically illustrates an arrangement when the CFP transceiver is going to be installed in the host system. The CFP transceiver 10, setting into a port 20b prepared in the face panel 20a of the host system 20 and sliding rearward between the rails 21b as being defined its horizontal position by the rail, makes the electrical connection with the host system by mating the electrical plug prepared in the rear end of the CFP transceiver 10 with the electrical connector 22 set on the host board 20c. As for the optical communication, the CFP transceiver 10 provides, in the front face 10a thereof, two optical ports, 10b and 10c for the transmission and the reception, respectively, which is called as the optical receptacle 11 and makes it possible to communicate with other CFP transceiver 10 in the full-duplex asynchronous mode.

According to the standard currently discussed, the CFP transceiver 10 converts ten (10) electrical signals each having the transmission speed of 10 Gbps into four (4) electrical signals each having the speed of 25 Gbps and transmits four (4) optical signals each having different wavelengths for the transmission mode. As for the reception mode, the CFP transceiver 10 receives four optical signals with respective wavelengths different from each other, de-multiplexes these four optical signals, converts the optical signals into four (4) electrical signals with the speed of 25 Gbps, de-multiplexes these four (4) electrical signals into ten (10) signals with the speed of 10 Gbps, and outputs these ten (10) signals to the host system.

Figure 2:
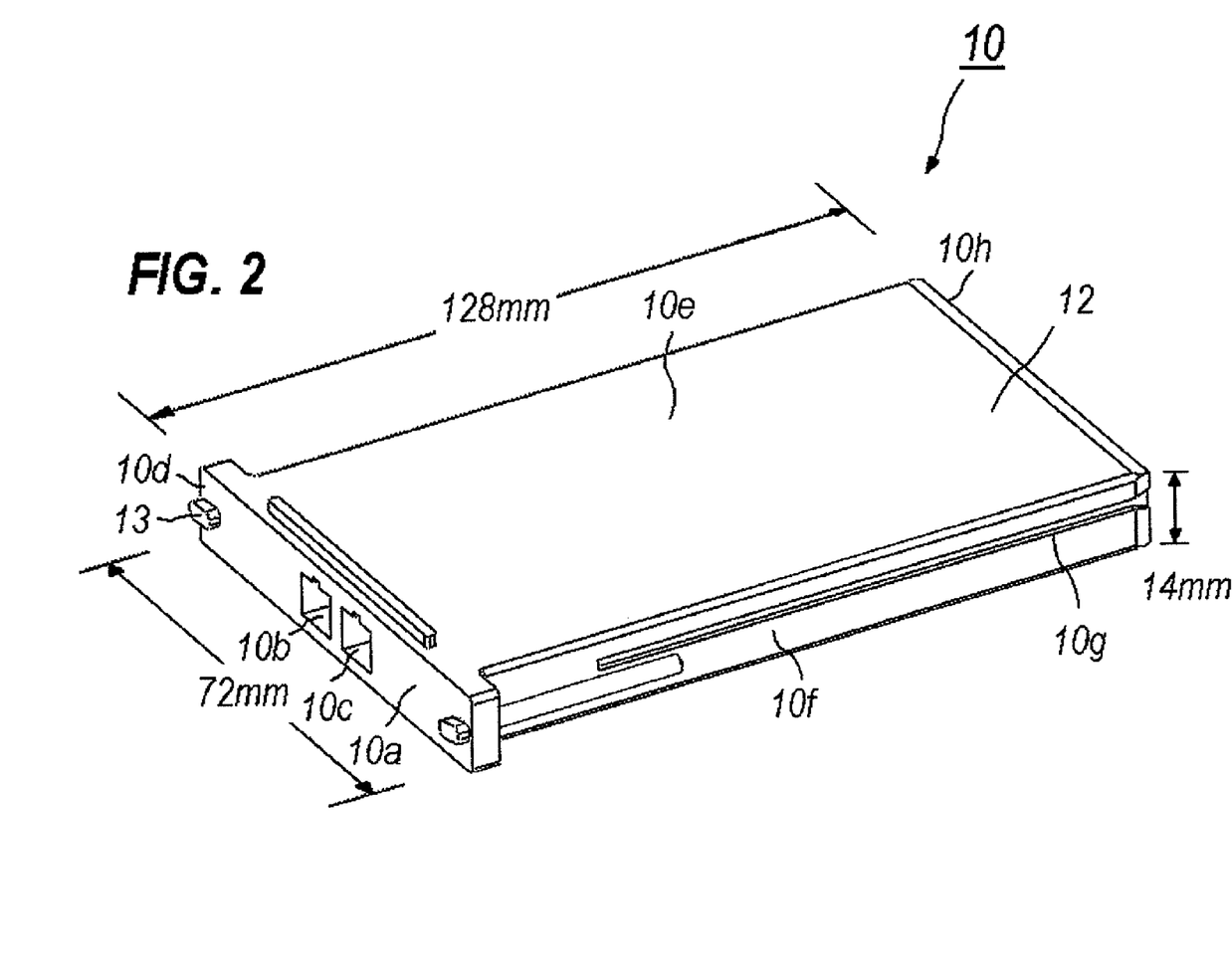
FIG. 2 is a perspective view of the CFP transceiver according to an embodiment of the present invention.

FIG. 2 is an outer appearance of the CFP transceiver 10. According to the proposed standard, the CFP transceiver 10 has the outer dimension of 128×72×14 mm3 for a box-shaped housing 12, into which whole functions mentioned above are implemented. The front face 10a of the CFP transceiver 10 provides two optical ports (optical receptacle), 10b and 10c, in a center thereof and each side provides a flange 10d with a screw 13 to fix the CFP transceiver 10 to the host system 20. The details of the screw 13, namely, the function thereof and the mating mechanism to the host system will be described later.

The ceiling 10e of the CFP transceiver 10 is formed in flat to come in stably contact with the heat-radiating fin to enhance the heat dissipating efficiency. Each side 10f of the CFP transceiver 10 forms the groove 10g in a side close to the ceiling 10e. The CFP transceiver 10 may mate with the connector 22 as sliding the rib 21k formed in the rail 21b within this groove 10g. The housing 12 may be made of metal, in particular, preferably made of metal die casting. Because the volume of the housing 12 becomes greater compared with those of the conventional transceiver of the former generation, which makes the CFP transceiver 10 heavier, and the operational speed thereof exceeds 10 Gbps (the base clock frequency becomes over 20 GHz), the housing 12 is necessary to be robust and thermo-tolerant.

Figure 3:
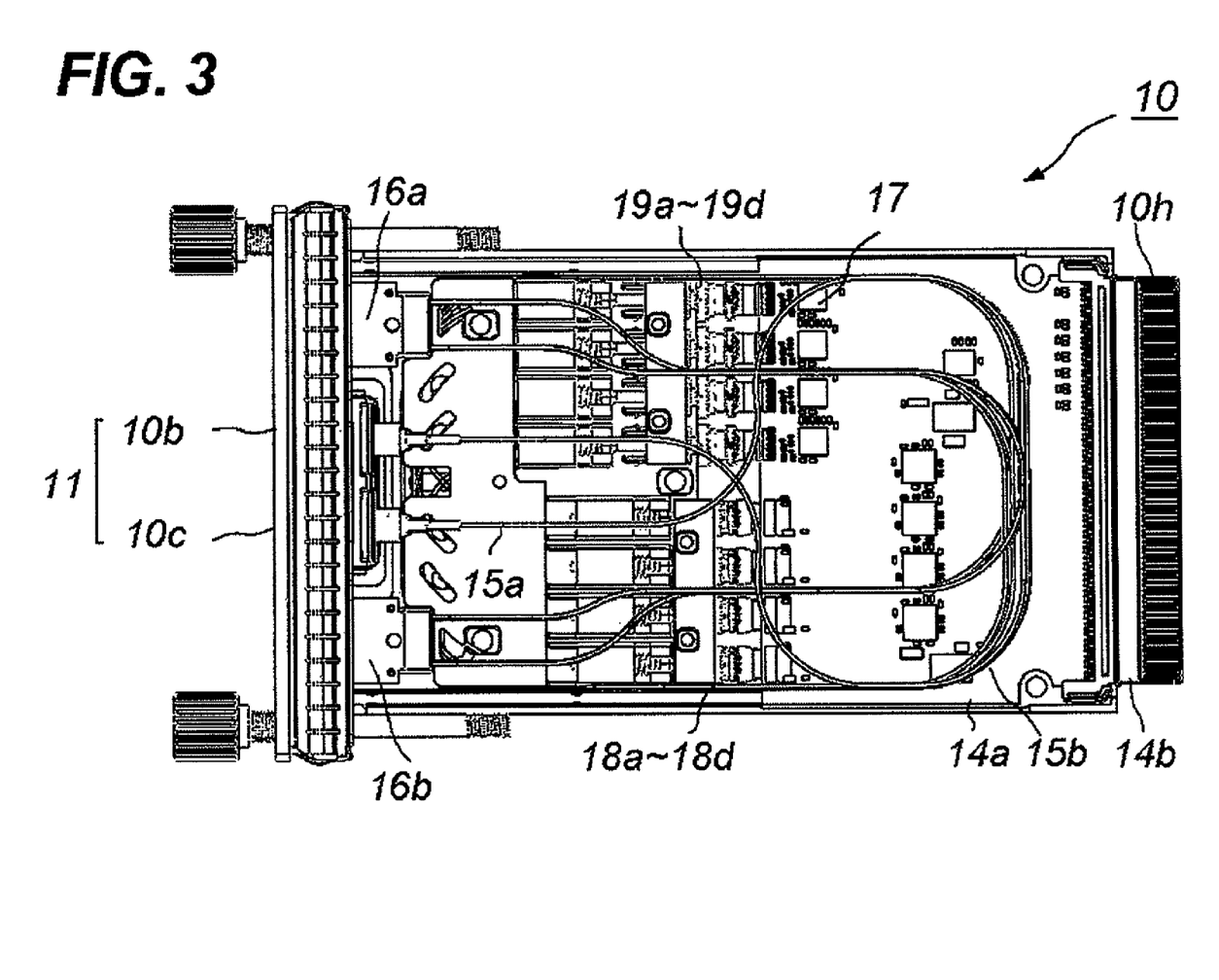
FIG. 3 illustrates an inner arrangement of the CFP transceiver.
Figure 4:
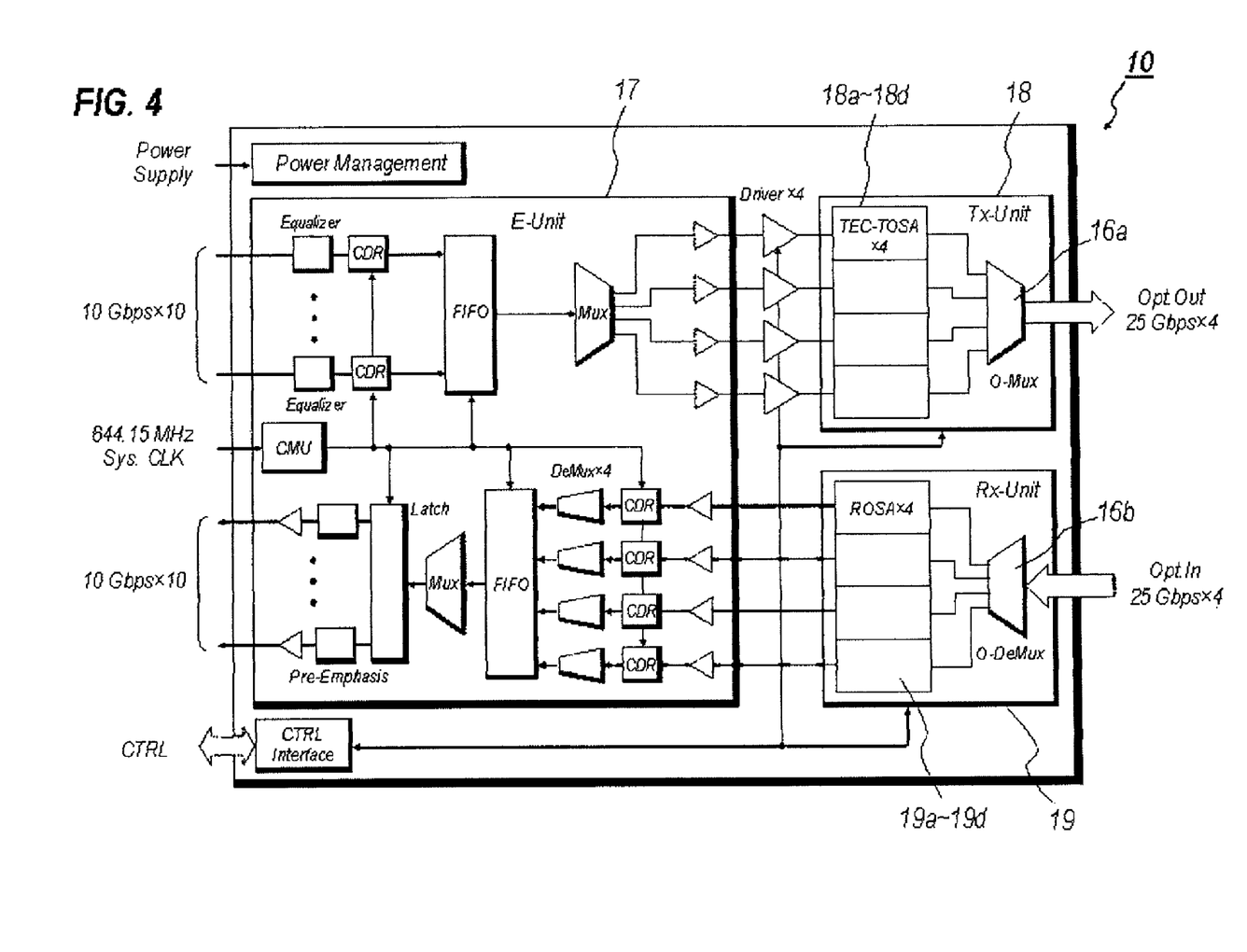
FIG. 4 is a functional block diagram of the CFP transceiver.
Figure 5:
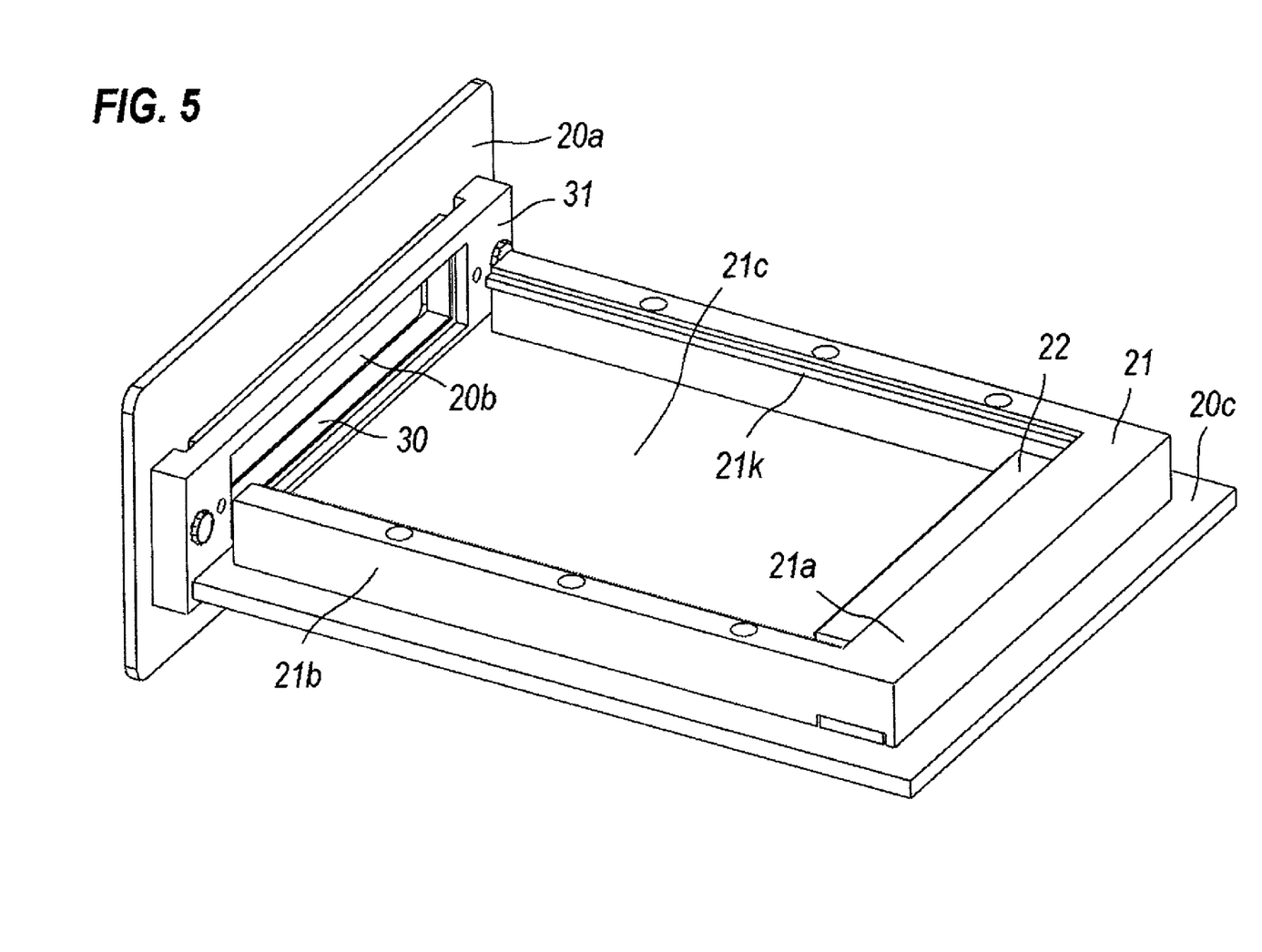
FIG. 5 illustrates, which is viewed from the side of the host system, the rail and the face panel into which the CFP transceiver is to be set.

FIG. 3 schematically illustrates the arrangement of electrical and optical components in the CFP transceiver 10, and FIG. 5 is a functional block diagram of the transceiver 10. The explanation provided below will concentrate the receiver function. The CFP transceiver 10 installs the optical components in a front side, namely, the side where the optical receptacle is prepared, while, it arranges the electrical components in a rear side.

The light coming from the optical connector that is mated with the optical receptacle 11 enters the optical de-multiplexer (O-DeMux) 16 through the first connection fiber 15a. The O-DeMux 16 divides the entered optical signal, which includes 4 independent optical signals with different wavelengths from each other, into four (4) optical signals depending on their wavelengths, from 1295 nm to 1310 nm with a span of 5 nm. Respective optical signals thus de-multiplexed enter corresponding ROSAs, 19a to 19d. The ROSA, 19a to 19d, converts the optical signal into the electrical signal and transmits this electrical signal to the processing IC (Rx and Tx-IC) 17 in which four (4) electrical signals each having the speed of 25 Gbps are converted into ten (10) electrical signals with the speed of 10 Gbps. These ten signals are outputs to the host system 20 through the electrical plug 19h and the electrical connector 22. Each ROSA, 19a to 19d, may install a pre-amplifier therein.

The Tx unit, although the direction of the optical or electrical signal is opposite to that of the Rx unit, performs the similar function with the Rx unit to emit the optical signal, which contains four (4) optical signals each having inherent wavelength different from each other, to the optical connector mated with the receptacle 11. When the processing IC 17 converts ten electrical signals with the speed of 10 Gbps into four (4) electrical signals with the speed of 25 Gbps, or carries out the reverse conversion, the IC 17 uses the first-in-first-out (FIFO) function with a data buffer. Moreover, both the Tx and Rx units reshape the signals with the speed of 10 Gbps by the equalizer in the Tx unit or by the pre-emphasizer in the Rx unit. The base clock within the CFP transceiver 10 has a speed of 644.5 MHz and this clock is provided from the host system 20.

As illustrated in FIG. 3, the first fiber 15a connecting the optical receptacle 11 with the O-Mux 16a and the O-DeMux 16b, and the second fiber 15b connecting the O-Mux/O-DeMux, 16a or 16b, with respective TOSAs, 18a to 18d, or ROSAs, 19a to 19d, extend in a whole portion within the housing 12. This is because the ordinary fiber currently available is hard to bend with a radius thereof smaller than 15 mm due to the bent loss of the fiber. Moreover, a substrate 14a on which the signal processing ICs (Tx-IC and Rx-IC) 17 are mounted is independent of the other substrate 14b on which the electrical plug 10h is formed. This is because, although both substrates, 14a and 14b, are necessary to transmit the signals with the speed of 10 Gbps, one of them with the electrical plug is necessary to secure the dimensional preciseness not only in the outer shape thereof but the patterns of the electrical plug 10h thereon.

FIG. 5 illustrates the rail 21 with the electrical connector 22 mounted on the host board 20c, which is viewed from the host system. As described later, the rail 21 has a U-shape with a space 21c put between the legs 21b. Into this space 21c is set with the CFP transceiver 10 that is inserted through the port 20b of the front panel 20a. The rail 21 may be made of aluminum die casting and comprises a beam 21a in the rear end thereof with two legs 21b extending from the beam 21a. The planar shape of the rail 21 looks like "U" with the space 21c between the legs 21b. This space 21c, which is aligned with the port 20b of the face panel 20a, receives the CFP transceiver 10 inserted through the port 20b. The legs 21b provide the rib 21k in the inner wall thereof which is set within the groove 10g in the sides of the CFP transceiver 10. Below the beam 21a is provided with the electrical connector 22; and the bottom surface of the beam 21a forms a mechanism to align the beam 21a with the connector 22. Details of the mechanism will be described later as referring to FIGS. 8 to 10.

The shield gasket 30 is set in the rear surface of the face panel 20a by the gasket holder 31 so as to surround the port. The shield gasket 30, when the CFP transceiver 10 is set within the position between the legs 21b, comes in closely contact with the outer surface of the housing 12 of the CFP transceiver 10 to fill the gap of the port 20b. The inner dimension, a distance between two sides facing to each other, is set slightly narrower than the distance of the port 20b. Inserting the CFP transceiver 10 between the legs 21b, the gasket 30 crushes, which makes the gasket 30 in close contact with the CFP transceiver 10 such that the shield gasket 30 fills the gap formed between the edges of the port 20b and the housing 12 of the CFP transceiver 10. Thus, the port 20b securely setting the CFP transceiver 10 therein may reliably protect the electro-magnetic wave from leaking from the host system through the gap.

As described above, the CFP transceiver 10 operable at the 100 Gbps transmits to or receives from the host system 10 channeled 10 Gbps electrical signals. In addition, the capacity of the electrical power supplied from the host system becomes larger as the transmission speed increases, which inevitably accompanies with the increase of count of the power supply pin in the electrical connector. Further, the number of the ground pin necessary to transmit high frequency signals reliably increases. Accordingly, the CFP transceiver 10 provides the electrical plug, also the electrical connector 22 on the host board, with total 148 electrodes in both sides of the substrate, and secures the width of each electrode to be only 0.3 mm. Therefore, the rail 20 is required, not only the function to slide the CFP transceiver 10 in front and rear to mate the plug 10h with the connector 22 but the function to set the CFP transceiver 10 rigidly in the left and right directions. Accordingly, the CFP transceiver 10 of the present application provides the mechanism that the screws 13 in both sides of the front face 10a are directly tightened with the rail 21 not the face panel 20a.

Figure 6:
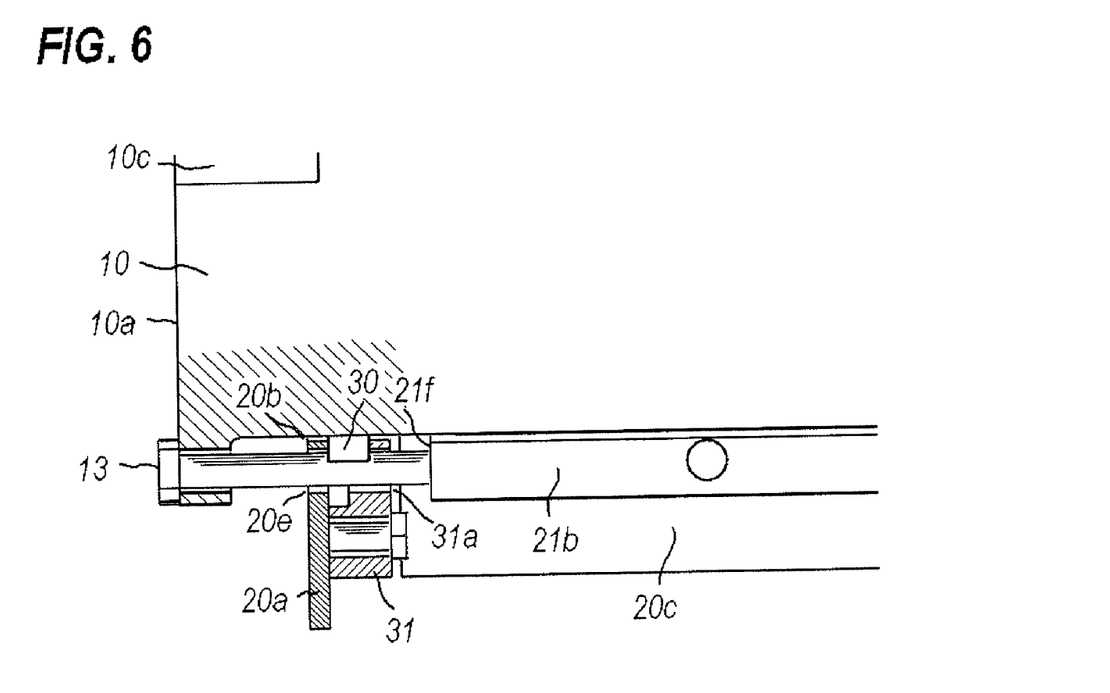
FIG. 6 magnifies the front portion of the rail and the face panel of the host system to describe the mechanism to fix the CFP transceiver to the rail.
Figure 7:
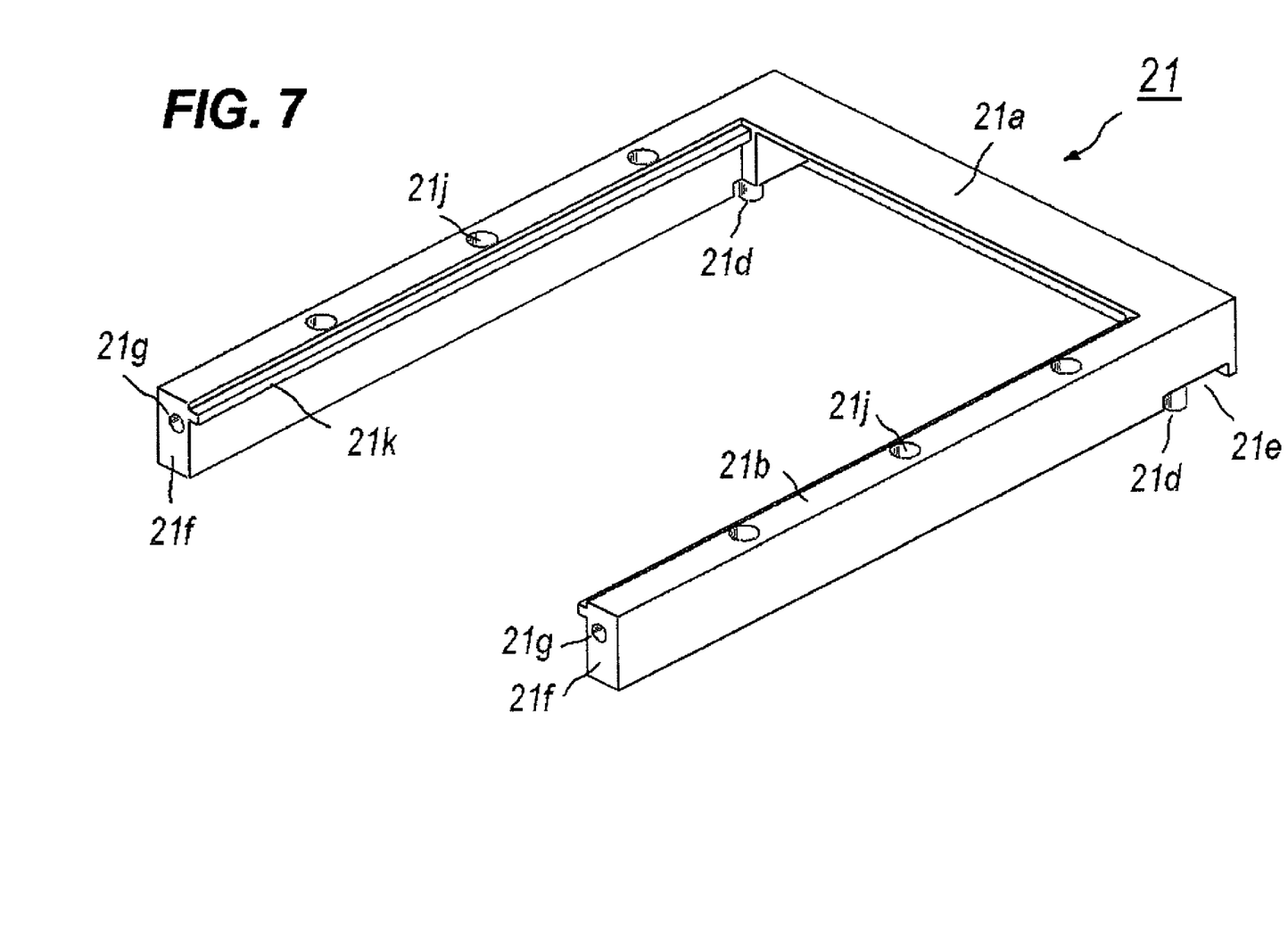
FIG. 7 is a perspective drawing of the rail viewed from the top of the front side.

FIG. 6 magnifies the front portion of the rail 21 and the CFP transceiver 10, while, FIG. 7 is a perspective drawing of the rail 21 viewed from the top. The screw 13 set in the front face 10a of the CFP transceiver 10 is fastened directly with the screw hole 21g provided in the front face 21f of the leg 21b by passing through the face panel 20a and the gasket holder 31. Thus, the hole 20e in the face panel 20a and the hole 31a in the holder 31 do not show any function to fasten the screw 13 of the CFP transceiver 10.

Figure 8:
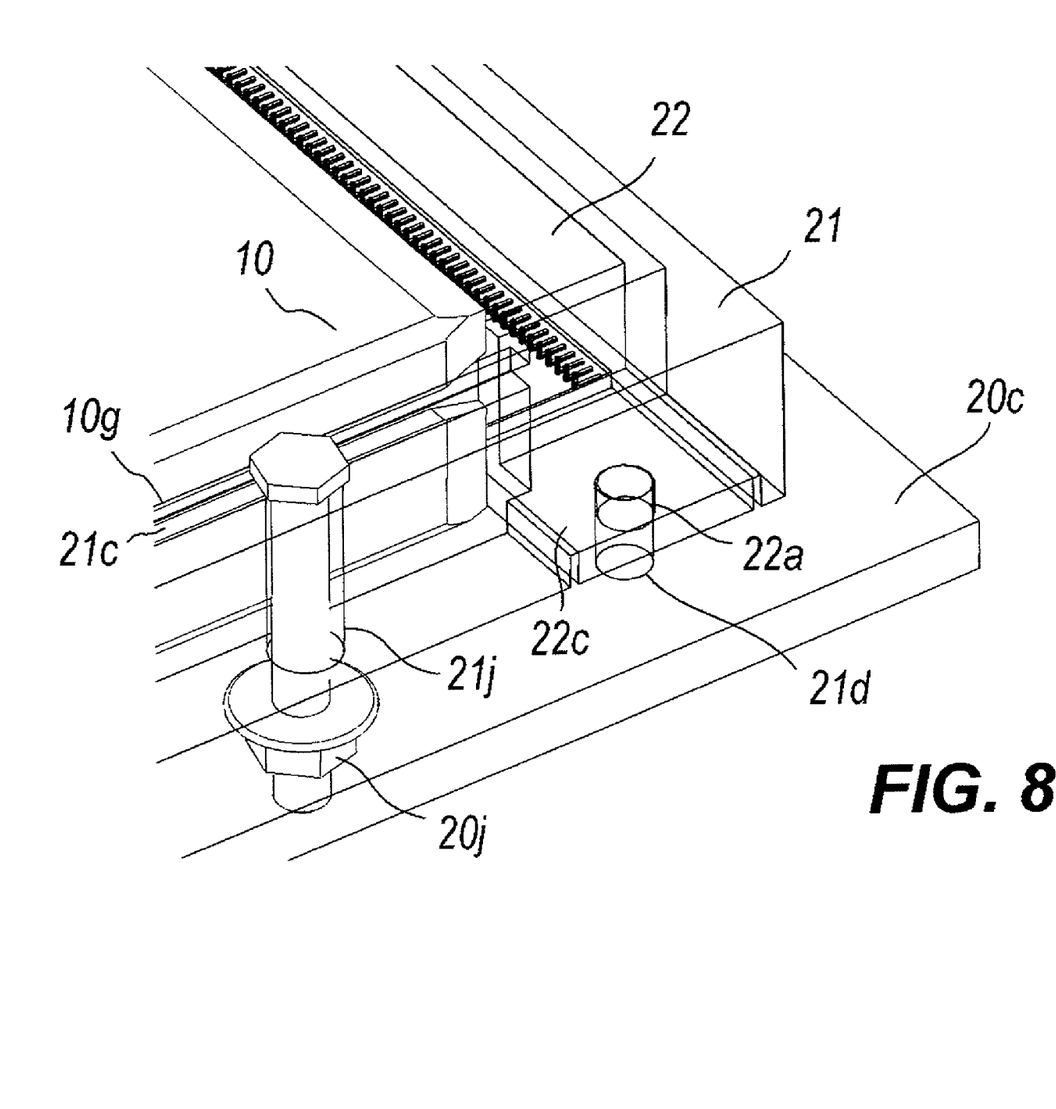
FIG. 8 is a projective drawing to illustrate the mechanism to secure the relative position between the rail and the connector.
Figure 9A:
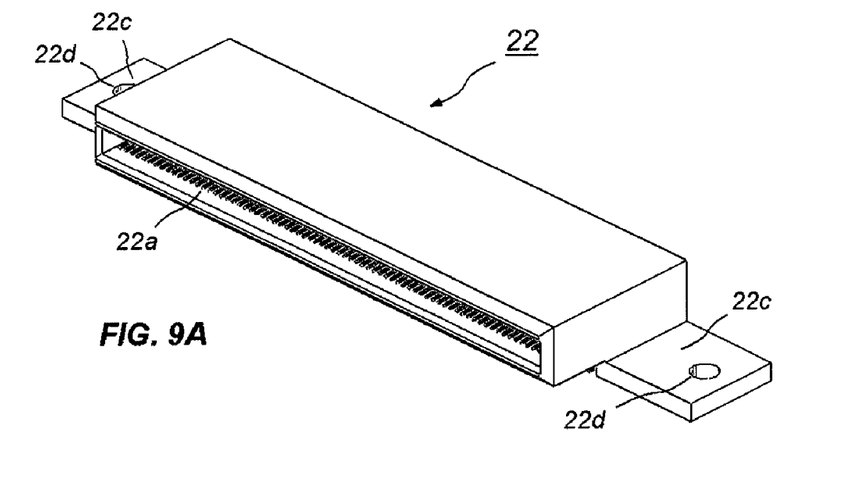
FIGS. 9A and 9B are perspective views of the connector.
Figure 9B:
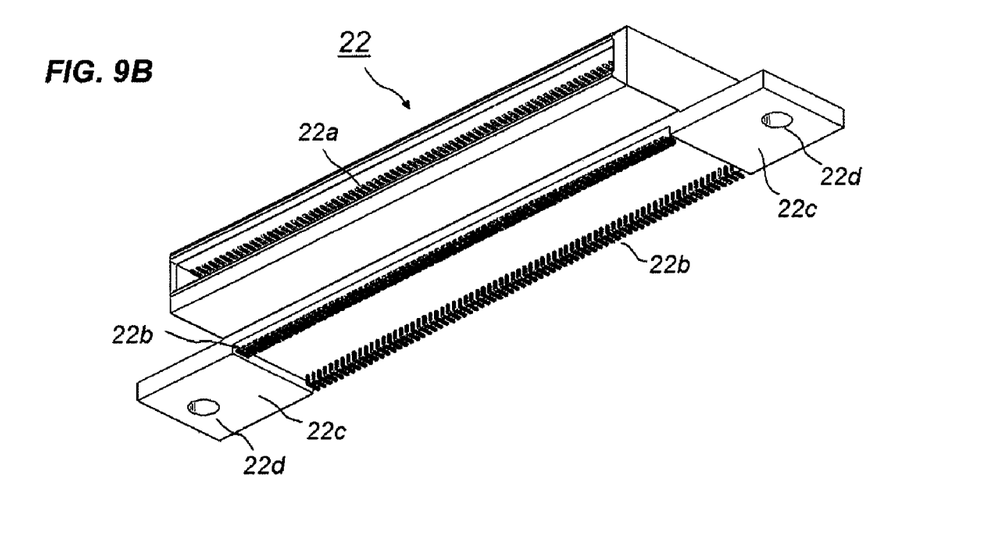
Figure 10:
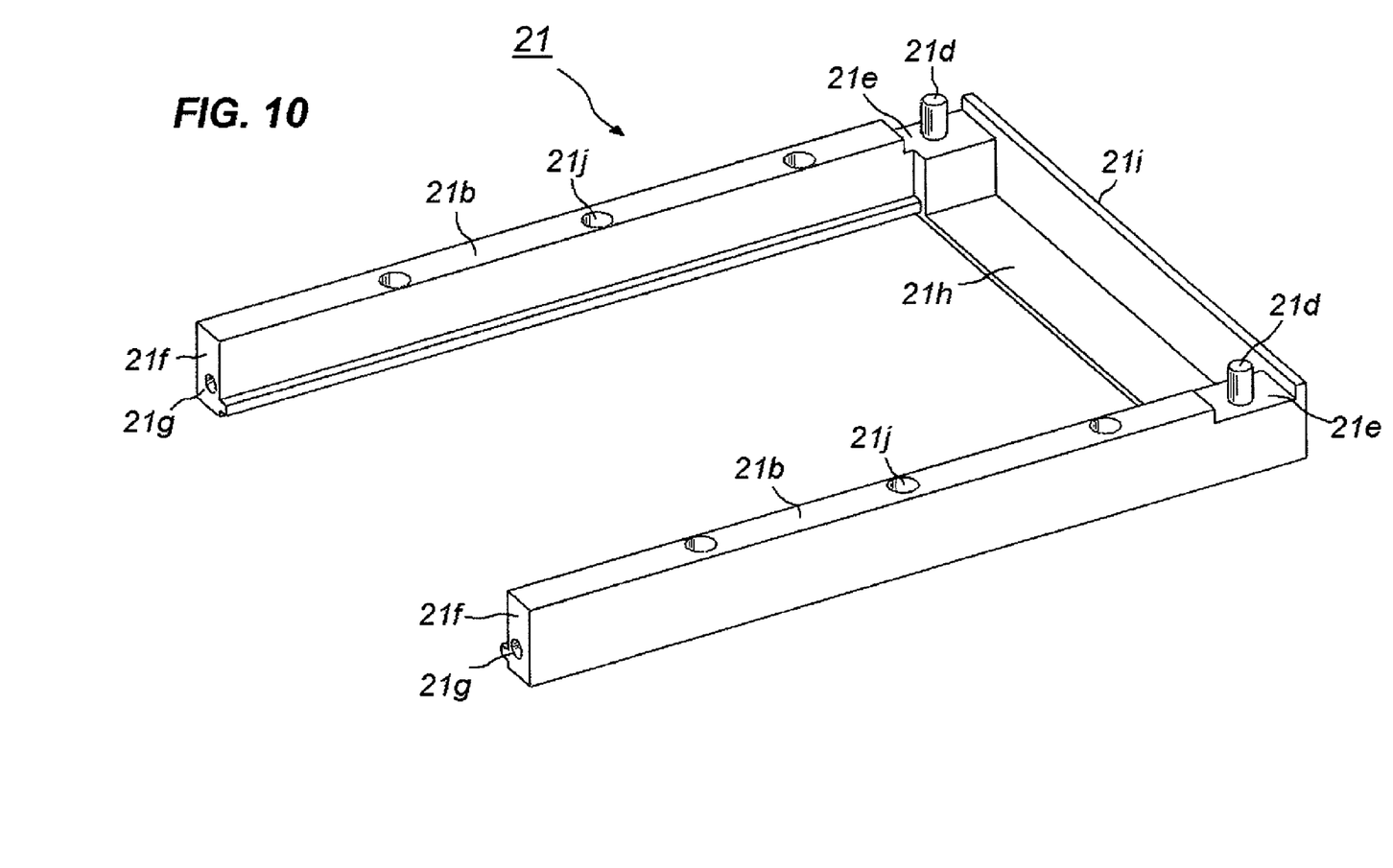
FIG. 10 if a perspective drawing of the rail viewed from the bottom thereof.

The rail 21 according to the present invention further provides a function or a mechanism to be aligned with the connector 22. That is, as illustrated in FIGS. 7 to 9, the connector 22 whose primary portion is made of resin has many metal brushes 22a, a total count thereof reaching 148, coming in contact with the corresponding electrodes of the plug in the CFP transceiver 10. These brushes 22a are connected with the connector pins 22b which extend from the bottom of the body and connect with the interconnecting patterns on the host board 20c. Because the pitch of the electrodes of the plug 10h is 0.8 mm, the pitch of the brush 22a is set to be 0.8 mm. In both sides of the bottom of the connector body is provided with aside extension 22c where an alignment hole 22d is formed. To mate this alignment hole 22d with an alignment pin 21d provided in the rail 21, which is explained below, automatically determines the position of the rail 21 relative to the connector 22. The alignment between the connector 22 and the rail 21 may have another mechanism opposite to those above mentioned. That is, the side extension 22c may provide the alignment pin, while, the rail may have the alignment hole to receiver the pin FIG. 10 is a bottom view of the rail 21. The beam 21a of the rail 21 provides a cover 21h in the ceiling and a skirt 21i in the rear end thereof. The cover 21h and the skirt 21i form a space into which the connector 22 is set. The bottom surface of the beam in both sides thereof forms a scooped step 21e whose depth is slightly larger than a thickness of the side extension 22c of the connector 22. The step 21e projects the alignment pin 21d which is mated with the alignment hole 22d in the side extension 22c of the connector 22.

Both legs 21b of the rail have a plurality of screw holes 21j, into which the screws 20j are inserted from the back surface of the host board 20c, are tightened to fix the rail 21 against the host board 20c. The assembly of the rail 21 and the connector 22 is performed as follows: First, the pins 22b of the connector 22 are set in respective positions, that is, set within respective via holes in the host boar 20c and soldered; next, covering the connector 22 by the ceiling 21h and the skirt 21i of the rail 21, the alignment pin 21d is set within the alignment hole 22e in the side extension 22c, which determines the relative position of the rail 21 to the connector 22, and finally, as keeping the position of the rail 21, screws 20j from the back surface of the host board 20c are tightened with the rail 21 to fix the rail 21 to the host board 20c rigidly. The fixing of the rail 21 by the screw 21j is necessary to be carried out only along a direction vertical to the host board 20c. It is inappropriate that the force by tightening the rail 21 with the screw 21j affects the horizontal direction. Thus, the CFP transceiver 10 may be set with the connector 22 as securing the relative position therebetween.

Next, a mechanism to set the gasket to the face panel will be described.

Figure 11A:
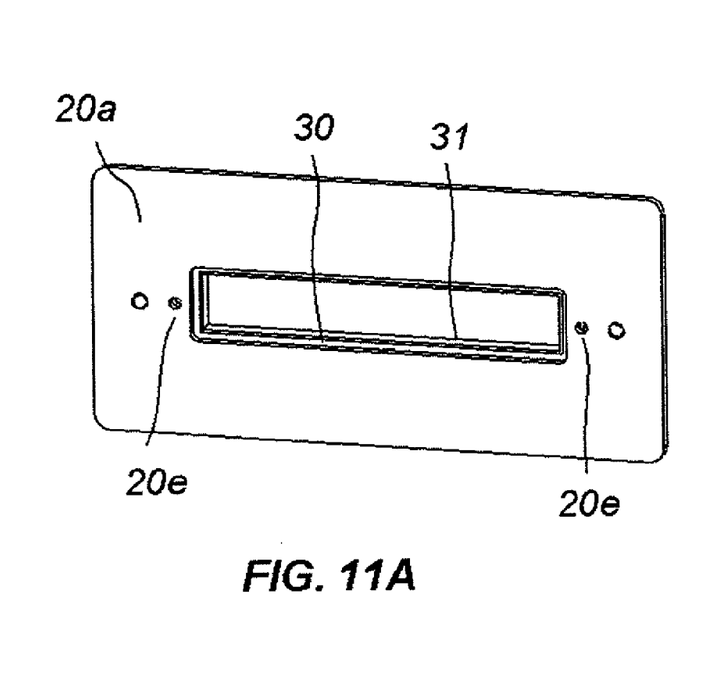
FIGS. 11A and 11B are perspective view of the face panel and the gasket holder and the gasket put between the gasket holder and the face panel, which is assembled in the rear surface of the face panel.
Figure 11B:
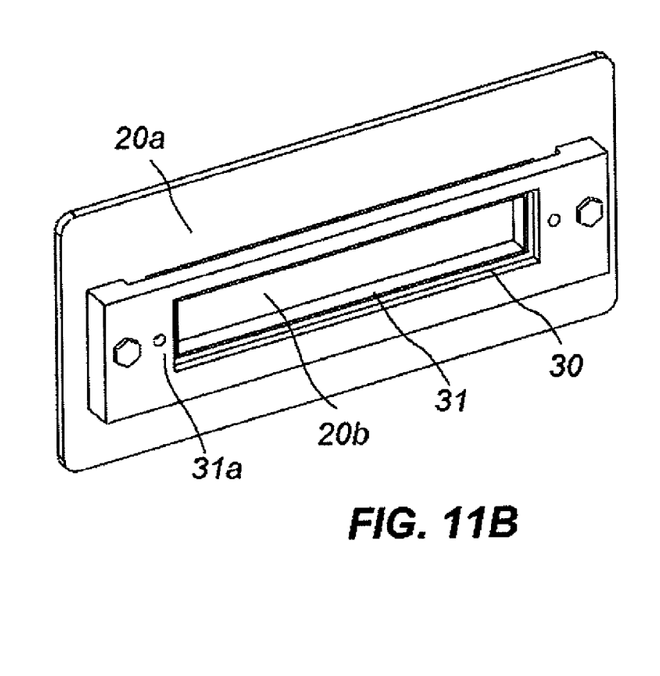
Figure 12A:
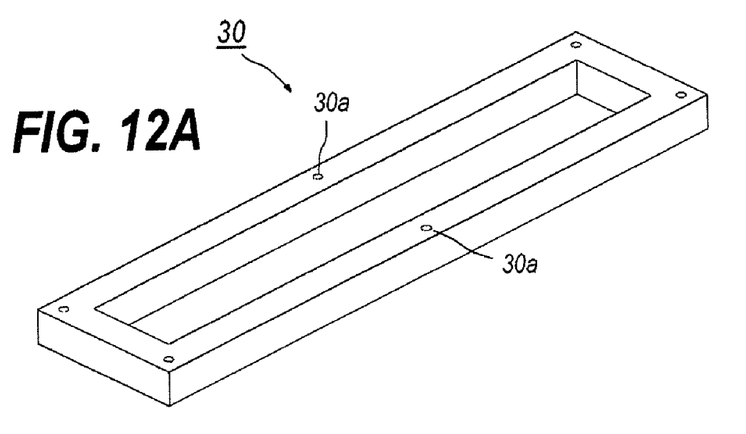
FIG. 12A is a perspective view of the gasket.
Figure 12B:
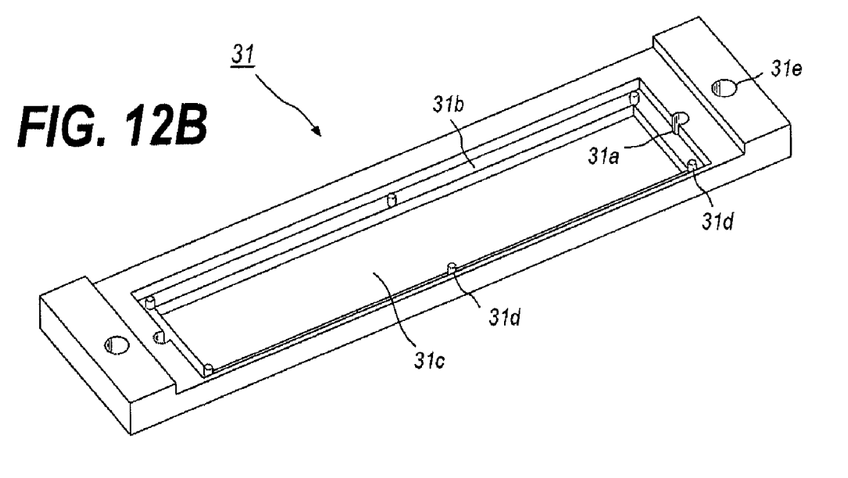
FIG. 12B is a perspective view of the gasket holder.

FIG. 11A and FIG. 11B illustrate the gasket 30 attached to the face panel 20a viewed from the inside of the host system, FIG. 12A expands the gasket 30, while FIG. 12B shows the gasket holder 31. The gasket 30 provides six pin holes 30a in respective corners and center of wider edges thereof. The gasket holder 31 forms a hollow 31b so as to surround the port 31c through which the CFP transceiver 10 passes. The hollow 31b corresponds to the gasket 30 and provides six pins 31d in respective corners and wider edges, which holds the gasket 30 within the hollow 31b as passing the pins 31d into the pin holes 30a of the gasket 30.

The gasket provides four pin holes in respective corners thereof. The gasket holder 31 has two types of holes in respective sides, an inner hole 31a which passes the screw 13 to fix the CFP transceiver 10 to the rail 21, while an outer one 31e which passes the screw to assemble the gasket holder 31 with the face panel 20a.

In this arrangement shown in FIGS. 12A and 12B, an inner dimension of the gasket 30 between edges facing to each other is set slightly smaller than an inner dimension between edges corresponding to the port 20b. The CFP transceiver 10 is set in the port 20b as expanding the gasket 30 by the housing 12 of the CFP transceiver 10, and the gap between the housing 12 and the port 20b is sealed with the gasket 30d.

Figure 13:
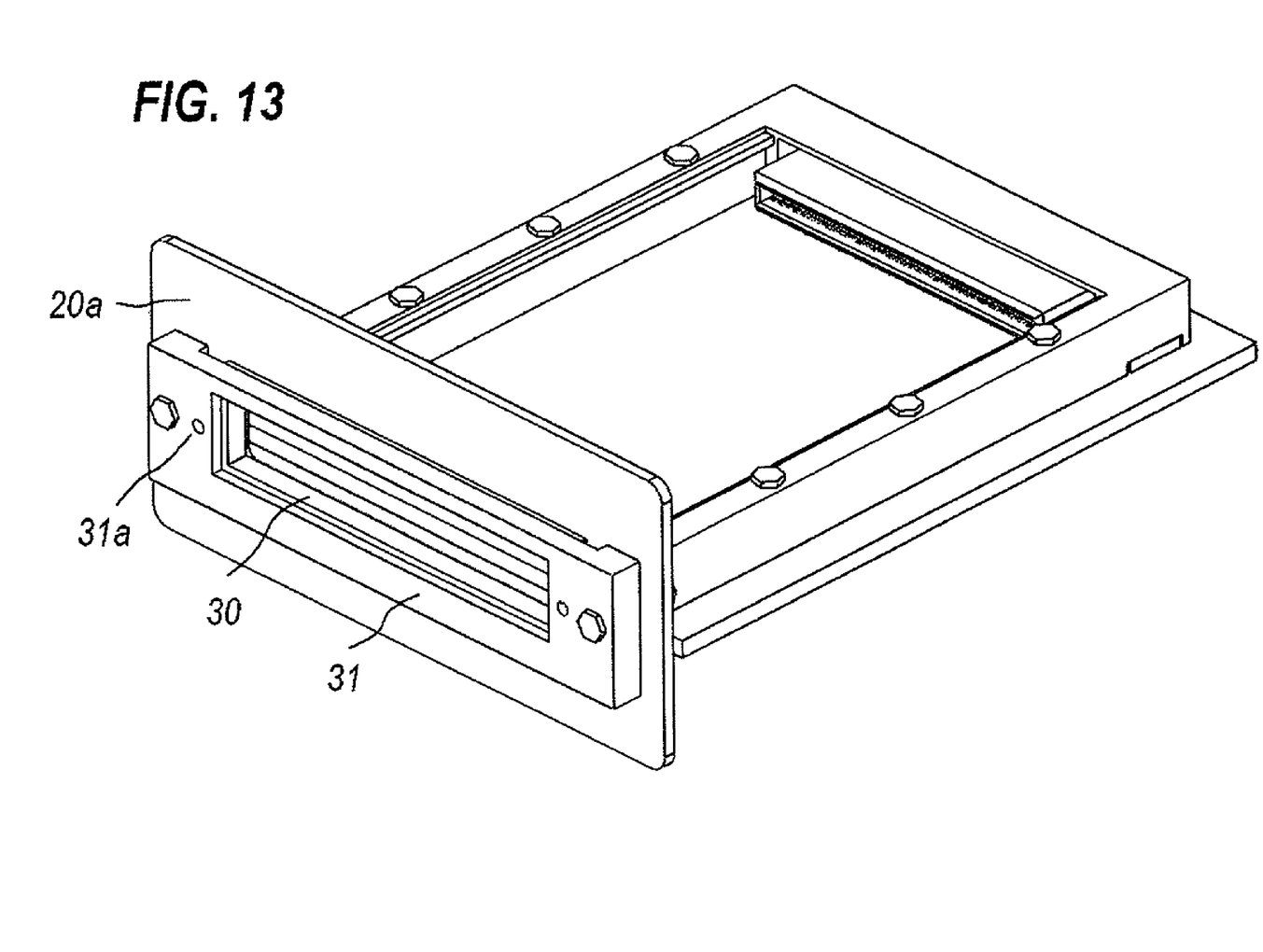
FIG. 13 illustrates a modified arrangement of the gasket holder with the gasket, which is attached to the front side of the face panel.

FIG. 13 illustrates a modified arrangement of the gasket 30 and the gasket holder 31. In the previous arrangement shown FIGS. 11A to 12B, because the inner dimension of the gasket 30 is slightly smaller than that of the port 20b, the CFP transceiver 10 inevitably comes in contact with the gasket 30 when it is set with in the port 20b. However, this case may impede the insertion or the extraction of the CFP transceiver 10. In the modified arrangement shown in FIGS. 13 to 14B, the inner dimension of the gasket 30 may be set slightly larger than that of the port 20b. Inserting the CFP transceiver 10 into the port 20b and tightening the screw 13 with the rail 21, the gasket 30 may be crushed to fill the gap between the CFP transceiver 10 and the port 20b.

Figure 14A:
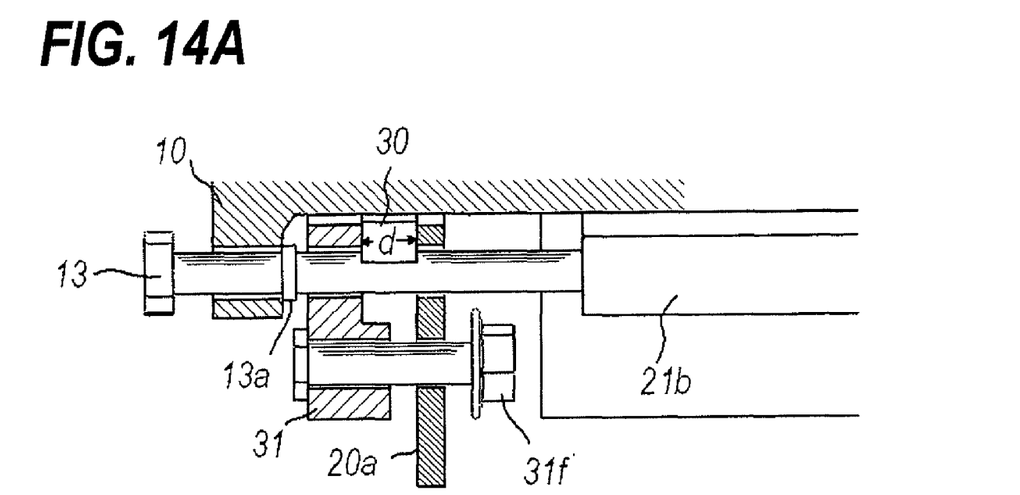
FIGS. 14A and 14B explain a mechanism to crush the gasket when the CFP transceiver is set in and fixed to the rail.

That is, this modified arrangement provides the gasket 30 and the gasket holder 31 in the front side of the face panel 20a. In the ordinary condition when the port 20b is free from the CFP transceiver 10 or the screw 13 of the CFP transceiver 10 is not tightened, a gap "d" between the gasket holder 31 and the face panel 20a becomes a thickness of the gasket 30 when it is free from the stress, or slightly wider than this thickness. The screw 31f to set the holder with the face panel 20a may adjust this interval (FIG. 14A).

Figure 14B:
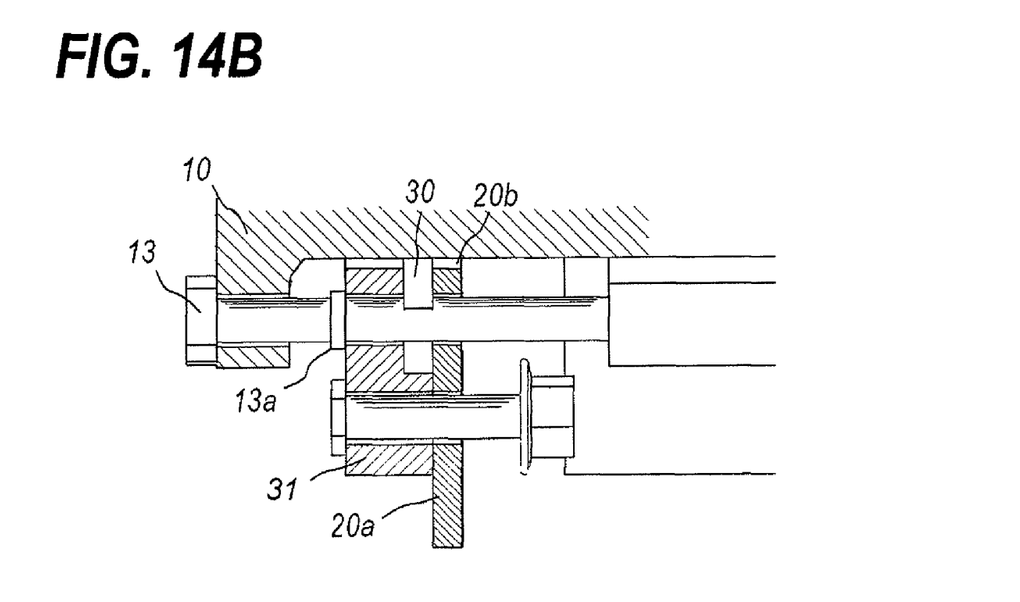

Tightening the screw 13 with the rail 21, not only the CFP transceiver 10 is rigidly set in the rail 21 but the flange 13a provided in a midway of the screw 13 presses the gasket holder 31 against the face panel 20, whereby the gasket holder 31 crushes the gasket 13 and the gasket 30 fills the gap between the CFP transceiver 10 and the port 20b. In this modified arrangement, the gasket 30 may have the inner dimension slightly larger than that of the port 20b and may fill the gap between the port 20b and the CFP transceiver 10 inserted therein by being crushed with the gasket holder 31. That is, the CFP transceiver 10 may be not impeded by the gasket 30 when it is set within the port 20b, which enables for the CFP transceiver 10 to set in the rail 21 smoothly.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

I claim:

1. A pluggable system to fix an optical transceiver to a host system, comprising:
   a rail provided in said host system, said rail including a beam and a pair of legs each extending from a side of said beam, said beam and said legs forming a space to receive said optical transceiver;
   a face panel provided in said host system, said face panel including a port through which said optical transceiver passes to be received in said rail;
   an electrical connector provided in said host system, said electrical connector being aligned with said beam of said rail; and
   a screw provided in said optical transceiver, said screw passing through said face panel and being fastened to a surface of said rail facing said face panel, wherein said screw is free from said face panel.

2. The pluggable system of claim 1, wherein said electrical connector provides an extension in a side thereof and said beam provides a hollow to receive said extension,
   wherein said extension provides a pin and said hollow provides a hole to receive said pin to align said connector with said rail.

3. The pluggable system of claim 1, wherein said optical transceiver communicates with said host system by a plurality of electrical signals each having a transmission speed exceeding 10 Gbps, and
   wherein said electrical connector provides at least one ground electrode corresponding to each electrical signal.

4. The pluggable system of claim 3, wherein said electrical connector provides more than 100 electrodes.

5. The pluggable system of claim 4, wherein said electrical connector provides a plurality of electrodes with a pitch smaller than 1 mm.

6. The pluggable system of claim 1, wherein said rail is made of metal and said electrical connector is made of resin.

7. The pluggable system of claim 1, wherein said rail provides a rib and said optical transceiver provides a groove,
   wherein said transceiver is set in the rail by sliding the rib within the groove.

8. The pluggable system of claim 1, wherein said rail provides a groove and said optical transceiver provides a rib,
   wherein said transceiver is set in the rail by sliding the rib within the groove.

9. A pluggable system to fix an optical transceiver to a host system, comprising:
   a rail provided in said host system, said rail including a beam and a pair of legs each extending from a side of said beam to form a space to receive said optical transceiver therein;
   a face panel provided in said host system, said face panel including a port through which said optical transceiver passes to be received in said rail;
   an electrical connector provided in said host system, said electrical connector being aligned with said beam; and
   a screw provided in said optical transceiver, said screw being fastened to said rail as passing through said face panel so as not to be fixed to said face panel,
   wherein said electrical connector provides an extension with a hole in a side of said electrical connector and said beam provide a pin in a hollow thereof, said pin being inserted into said hole to align said electrical connector with said rail.

10. The pluggable system of claim 9, wherein said electrical connector provides an extension in a side thereof and said beam provides a hollow to receive said extension, wherein said extension provides a pin and said hollow provides a hole to receive said pin to align said connector with said rail.

11. The pluggable system of claim 9, wherein said optical transceiver communicates with said host system by a plurality of electrical signals each having a transmission speed exceeding 10 Gbps, and wherein said electrical connector provides at least one ground electrode corresponding to each electrical signal.

12. The pluggable system of claim 11, wherein said electrical connector provides more than 100 electrodes.

13. The pluggable system of claim 12, wherein said electrical connector provides a plurality of electrodes with a pitch smaller than 1 mm.

14. The pluggable system of claim 9, wherein said rail is made of metal and said electrical connector is made of resin.

15. The pluggable system of claim 9, wherein said rail provides a rib and said optical transceiver provides a groove, wherein said transceiver is set in the rail by sliding the rib within the groove.

16. The pluggable system of claim 9, wherein said rail provides a groove and said optical transceiver provides a rib, wherein said transceiver is set in the rail by sliding the rib within the groove.

* * * * *